United States Patent
Ma et al.

(10) Patent No.: US 9,735,852 B2
(45) Date of Patent: *Aug. 15, 2017

(54) SYSTEM AND METHOD FOR DOWNLINK CHANNEL SOUNDING IN WIRELESS COMMUNICATIONS SYSTEMS

(71) Applicant: Huawei Technologies Co., Ltd., Shenzhen (CN)

(72) Inventors: Jianglei Ma, Ottawa (CA); Peiying Zhu, Kanata (CA); Wen Tong, Ottawa (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,190

(22) Filed: Oct. 2, 2015

(65) Prior Publication Data

US 2016/0028462 A1 Jan. 28, 2016

Related U.S. Application Data

(63) Continuation of application No. 12/830,983, filed on Jul. 6, 2010, now Pat. No. 9,184,511.

(Continued)

(51) Int. Cl.
*H04B 7/06* (2006.01)
*H01Q 25/00* (2006.01)
(Continued)

(52) U.S. Cl.
CPC ........... *H04B 7/0617* (2013.01); *H01Q 25/00* (2013.01); *H04B 7/024* (2013.01); *H04B 7/0456* (2013.01);
(Continued)

(58) Field of Classification Search
CPC  H04B 17/003; H04B 17/004; H04B 17/0042; H04B 17/0067; H04B 17/0077;
(Continued)

(56) References Cited

U.S. PATENT DOCUMENTS 7,573,851 B2   8/2009 Xing et al.
8,089,911 B2   1/2012 Huang et al.
(Continued)

FOREIGN PATENT DOCUMENTS

CN   101453259 A   6/2009
CN   101478337 A   7/2009
(Continued)

OTHER PUBLICATIONS

•3rd Generation Partnership Project; Technical Specification Group Radio Access Network; Further Advancements for E-UTRA Physical Layer Aspects (Release 9),• Technical Report, 3GPP TR 36.814 v1.1.1, Jun. 2009, 39 pages, 3rd Generation Partnership Project.

(Continued)

*Primary Examiner* — Chi H Pham
*Assistant Examiner* — Weibin Huang
(74) *Attorney, Agent, or Firm* — Slater Matsil, LLP

(57) ABSTRACT

In accordance with an embodiment, a method of operating a base station configured to communicate with at least one user device includes transmitting a reference signal to the at least one user device, receiving channel quality information from the at least one user device, and forming a beam based on the channel quality information received from the at least one user device.

31 Claims, 7 Drawing Sheets

Related U.S. Application Data

(60) Provisional application No. 61/224,737, filed on Jul. 10, 2009.

(51) Int. Cl.
*H04B 7/024* (2017.01)
*H04B 7/0456* (2017.01)
*H04W 8/24* (2009.01)
*H04W 48/08* (2009.01)
*H04W 88/08* (2009.01)

(52) U.S. Cl.
CPC ......... *H04B 7/0632* (2013.01); *H04B 7/0639* (2013.01); *H04W 8/24* (2013.01); *H04W 48/08* (2013.01); *H04W 88/08* (2013.01)

(58) Field of Classification Search
CPC .......... H04B 7/02; H04B 7/04; H04B 7/0404; H04B 7/0408; H04B 7/0413; H04B 7/0417; H04B 7/0421; H04B 7/0426; H04B 7/043; H04B 7/0452; H04B 7/0456; H04L 43/08
See application file for complete search history.

(56) References Cited

U.S. PATENT DOCUMENTS

| | | | |
|---|---|---|---|
| 8,265,629 B2 | 9/2012 | Kwon et al. | |
| 8,582,672 B2 * | 11/2013 | Sanayei | H04B 7/0417 375/260 |
| 8,737,307 B2 | 5/2014 | Kim et al. | |
| 9,184,511 B2 * | 11/2015 | Ma | H01Q 25/00 |
| 2008/0108310 A1 | 5/2008 | Tong et al. | |
| 2008/0144737 A1 * | 6/2008 | Naguib | H04B 7/063 375/299 |
| 2009/0034427 A1 | 2/2009 | Sohn et al. | |
| 2009/0046570 A1 | 2/2009 | Sarkar et al. | |
| 2010/0054196 A1 * | 3/2010 | Hui | H04W 16/00 370/329 |
| 2010/0323612 A1 * | 12/2010 | Xu | H04B 7/022 455/7 |
| 2011/0149765 A1 | 6/2011 | Gorokhov et al. | |
| 2011/0268007 A1 * | 11/2011 | Barany | H04B 7/024 370/312 |
| 2012/0147805 A1 | 6/2012 | Kim et al. | |

FOREIGN PATENT DOCUMENTS

| | | |
|---|---|---|
| WO | 2008114743 A1 | 5/2008 |
| WO | 2009023532 A2 | 2/2009 |

OTHER PUBLICATIONS

•3rd Generation Partnership Project; Technical Specification Group Radio Access Network; Evolved Universal Terrestrial Radio Access (E-UTRA); Further Advancements for E-UTRA Physical Layer Aspects (Release 9),• Technical Report, 3GPP TR 36.814 v9.0.0, Mar. 2010, 104 pages, 3rd Generation Partnership Project.

PCT International Search Report and Written Opinion, Huawei Technologies Co., Ltd., et al., Application Serial No. PCT/CN2010/075091, mailing date Oct. 21, 2010, 11 pages.

\* cited by examiner

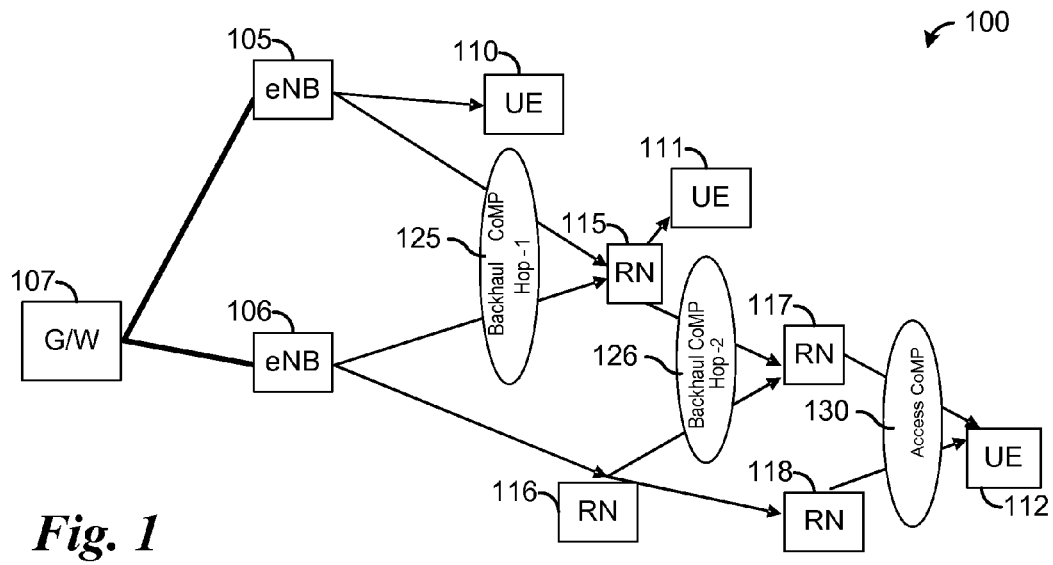
Fig. 1
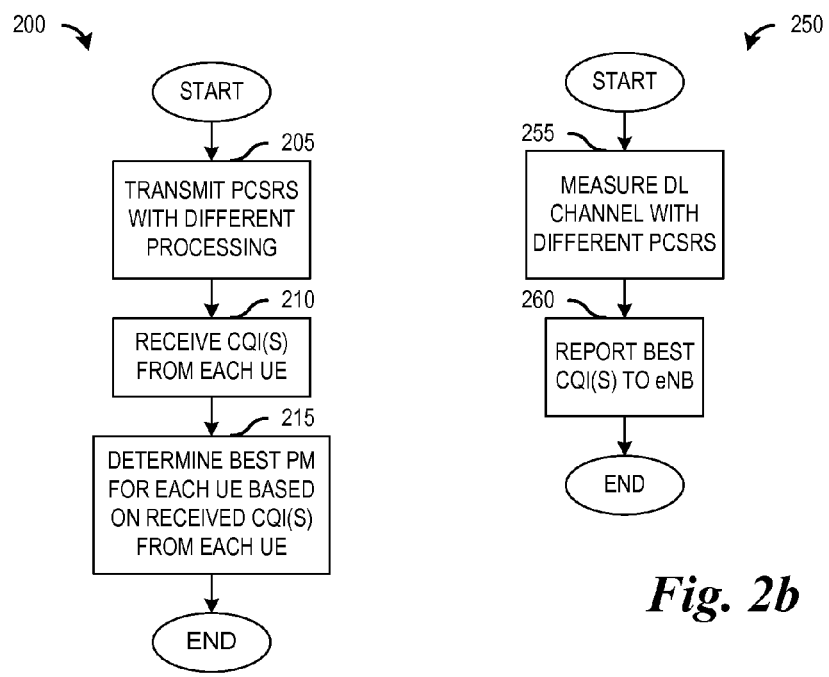
Fig. 2a
Fig. 2b

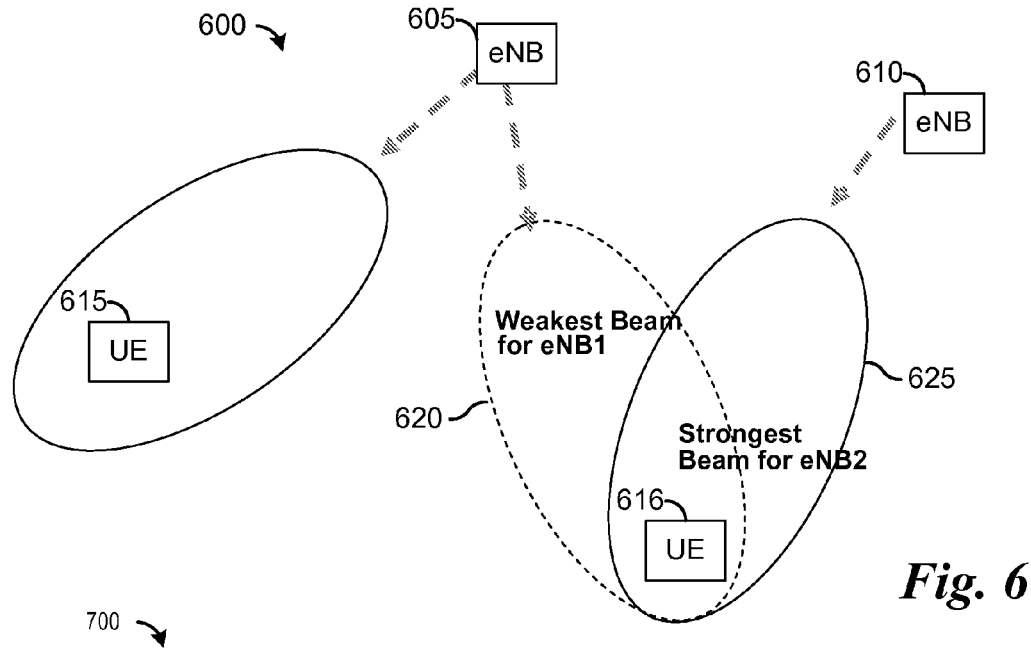
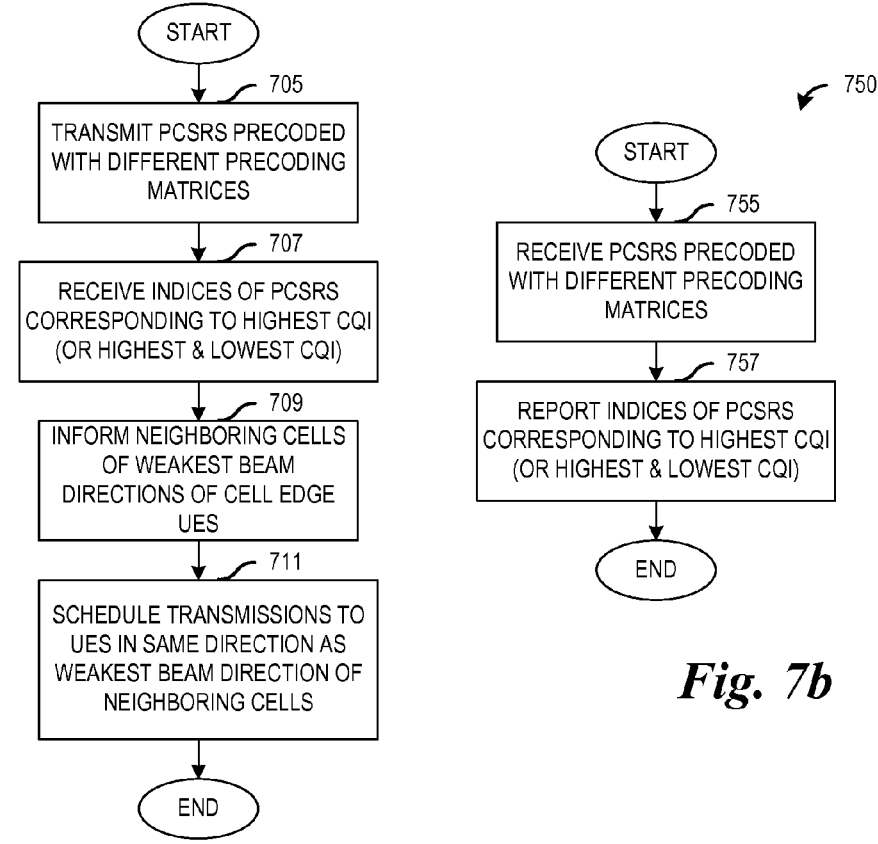
Fig. 6
Fig. 7a
Fig. 7b

SYSTEM AND METHOD FOR DOWNLINK CHANNEL SOUNDING IN WIRELESS COMMUNICATIONS SYSTEMS

CROSS REFERENCE TO RELATED APPLICATIONS

This patent application is a continuation of U.S. Non-Provisional patent application Ser. No. 12/830,983 filed on Jul. 6, 2010, entitled "System and Method for Downlink Channel Sounding in Wireless Communications Systems," which claims priority to U.S. Provisional Application No. 61/224,737 filed on Jul. 10, 2009, entitled "System and Method for Downlink Channel Sounding in Wireless Communications Systems," which applications are hereby incorporated by reference herein in their entirety.

TECHNICAL FIELD

The present invention relates generally to wireless communications, and more particularly to a system and method for downlink (DL) channel sounding in wireless communications systems.

BACKGROUND

Wireless communication systems are widely used to provide voice and data services for multiple users using a variety of access terminals such as cellular telephones, laptop computers and various multimedia devices. Such communications systems can encompass local area networks, such as IEEE 801.11 networks, cellular telephone and/or mobile broadband networks. The communication system can use a one or more multiple access techniques, such as Frequency Division Multiple Access (FDMA), Time Division Multiple Access (TDMA), Code Division Multiple Access (CDMA), Orthogonal Frequency Division Multiple Access (OFDMA), Single Carrier Frequency Division Multiple Access (SC-FDMA) and others. Mobile broadband networks can conform to a number of system types or partnerships such as, General Packet Radio Service (GPRS), 3rd-Generation standards (3G), Worldwide Interoperability for Microwave Access (WiMAX), Universal Mobile Telecommunications System (UMTS), the 3rd Generation Partnership Project (3GPP), Evolution-Data Optimized EV-DO, or Long Term Evolution (LTE).

In coordinated multi-point (CoMP) transmission, transmissions from multiple enhanced Node Bs (eNBs) are made simultaneously to a single User Equipment (UE) or to multiple UEs. Coordination of the transmissions made by the eNBs enable the UE to combine the transmissions to improve high data rate coverage and to increase system throughput in advanced wireless communications systems, such as Long Term Evolution-Advanced (LTE-A). eNBs are also commonly referred to as base stations, base transceiver stations, controllers, access points, and so forth, while UEs are commonly referred to as subscribers, subscriber stations, terminals, mobile stations, for example.

There are generally two CoMP approaches: joint processing from multiple cells (eNBs) and coordinated scheduling/beamforming (CS/CB). In joint processing, there is an assumption that data is available at each transmission point (eNB) in a CoMP cooperating set representing eNBs participating in the CoMP transmission. With joint processing, data is transmitted from more than one eNB at a time. Dynamic cell eNB selection occurs, on the other hand, when the data is transmitted from only one eNB at a time. In CS/CB, the data is available at a serving eNB, and transmission scheduling is coordinated among eNBs within the CoMP cooperating set.

To achieve better channel utilization and increase overall system performance, channel state/statistics/information about a downlink (DL) channel(s) between an eNB and a UE are provided by the UE to the eNB. The channel state/statistics/information provided by the UE enables the eNB to adjust its transmitter to more effectively make use of DL channel conditions.

In general, there are two types of channel state/statistics/information feedback schemes for LTE-A: explicit channel state/statistics/information feedback and implicit channel state/statistics/information feedback. In explicit feedback, an eNB determines the CoMP transmission processing matrix based on the whole or major part of the CoMP channel information. Better CoMP performance can, therefore, be obtained at the expense of a high feedback overhead. With explicit feedback, more information is provided to the eNB to give the eNB more flexibility in scheduling CoMP transmissions. If precoded DL reference signals are used, a selected CoMP transmission scheme can be transparent to the UE. However, uplink (UL) feedback overhead may be high when instantaneous channel information feedback is required.

In implicit feedback, an eNB determines the CoMP transmission processing matrix based on a precoding matrix indication (PMI)/rank indication (RI) recommended by UE. For non-coherent multi-point CoMP transmission, only disjoint PMI/RI information (or individual PMI for cells in CoMP cooperation set) is used. For coherent multi-point CoMP transmission, joint PMI/RI feedback containing individual PMI/RI information and additional inter-cell spatial information or a single joint PMI/RI information is used. Usually joint PMI/RI feedback has a higher overhead than disjoint PMI/RI feedback. With implicit feedback, the UE feeds back channel information based on transmit or receive processing, and incurs less feedback overhead. Implicit feedback may come at decreased scheduling flexibility.

LTE-A is capable of supporting advanced forms of multiple input, multiple output (MIMO), such as higher-order single user MIMO (SU-MIMO) or multi-user MIMO (MU-MIMO). For example, precoding with more than four (4) transmit antennas can be utilized in SU-MIMO and MU-MIMO. More accurate tuning of a transmit beam and/or closed-loop (CL) spatial channel to support of a variety of antenna configurations and propagation scenarios is desired to fully exploit the benefit of more advanced forms of MIMO.

SUMMARY OF THE INVENTION

In accordance with an embodiment, a method of operating a base station configured to communicate with at least one user device includes transmitting a reference signal to the at least one user device, receiving channel quality information from the at least one user device, and forming a beam based on the channel quality information received from the at least one user device.

In accordance with a further embodiment, a method for operating in a communications network having a plurality of communications devices includes performing a coarse tuning with the plurality of communications devices to achieve a first degree of spatial granularity; and performing a fine tuning with a subset of the plurality of communications devices to achieve a second degree of spatial granularity.

In accordance with a further embodiment, a base station includes an antenna, a transmitter coupled to the antenna, a receiver configured to receive channel quality information from at least one user device, and a processor calculating a beam direction for the least one user device, the beam direction based on the received channel quality information. The transmitter is configured to transmit a sounding signal to the at least one user device.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 1 is a diagram of a communications system;

FIG. 2a is a flow diagram of eNB operations in DL transparent channel sounding;

FIG. 2b is a flow diagram of UE operations in DL transparent channel sounding;

FIG. 6 is a diagram of PCSRS based channel sounding for CS/CB;

FIG. 7a is a flow diagram of eNB operations in PCSRS based DL channel sounding for CS/CB;

FIG. 7b is a flow diagram of UE operations in PCSRS based DL channel sounding for CS/CB;

DETAILED DESCRIPTION OF ILLUSTRATIVE EMBODIMENTS

Figure 3A:
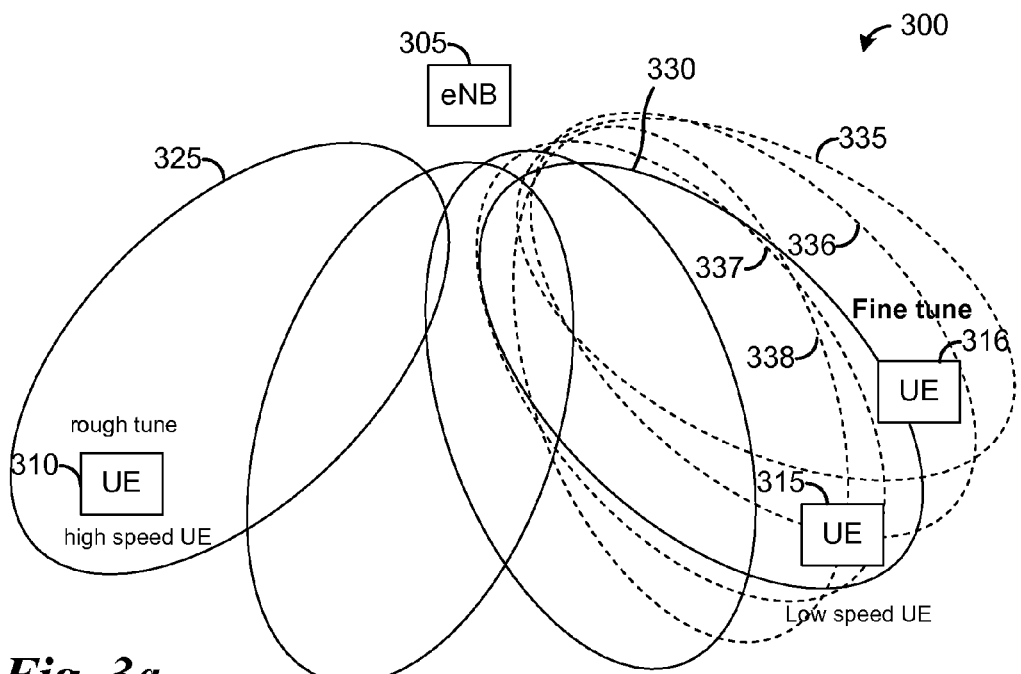
FIG. 3a is a diagram of iterative PCSRS based DL channel sounding in advanced MIMO.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, a system and method for downlink channel sounding in a wireless communication system. Embodiments of the invention may also be applied to other types of communications systems and networks.

FIG. 1 illustrates embodiment communications system 100. Communications system 100 includes a number of eNBs, such as eNB 105 and eNB 106 that may be connected to a gateway (G/W) 107 over a wired backhaul. The eNBs serve a number of UEs, such as UE 110, UE 111, and UE 112. Transmissions from the eNBs to the UEs may occur directly, such as from eNB 105 to UE 110, or indirectly, such as through a relay node (RN), including RN 115, RN 116, RN 117, and RN 118. For example, an indirect transmission occurs through a single RN, such as a transmission from eNB 105 to UE 111 through RN 115, or through more than one RNs, such as a transmission from eNB 106 to UE 112 through RN 116 and RN 118.

In an embodiment, a RN may be used to relay transmissions made by an eNB to a UE or a UE to an eNB. The use of the RN can increase the coverage area of the eNB. As discussed previously, CoMP transmission has been proposed to increase the coverage of a UE by allowing transmissions from multiple eNBs to be made simultaneously to the UE, commonly referred to as an access link. However, in embodiments, CoMP transmissions may also be used to increase the coverage of a RN by allowing transmissions from multiple eNBs or RNs to be made simultaneously to a the RN, commonly referred to as a backhaul link.

As shown in FIG. 1, a first backhaul CoMP transmission from eNB 105 and eNB 106 may be made to RN 115 (shown as backhaul CoMP hop-1 125) and a second backhaul CoMP transmission from RN 115 and RN 116 may be made to RN 117 (shown as backhaul CoMP hop-2 126). While an access link CoMP transmission from RN 117 and RN 118 may be made to UE 112 (shown as access CoMP 130). The system illustrated in FIG. 1 is one example of many embodiment network configurations. In alternative embodiments, any numbers of UE, eNBs and RNs can be used in other configurations.

Traditionally, CoMP transmission has been considered for an access link, which is a wireless link between an eNB and a UE, or between a relay node (RN) and a UE. However, in embodiments, CoMP transmission is also applied to backhaul link, which is a wireless link between an eNB and a RN, to enhance the coverage of the RN.

In embodiment communications systems with RNs, layered CoMP transmissions are applied to backhaul links as well as to access links With a backhaul CoMP transmission, a RN receives and transmit data from more than one eNB at a time. In an embodiment, this may occur as long as data is available in more than one eNB to allow for joint or coordinated transmissions to a particular RN, thereby enabling an inexpensive RN deployment. In further embodiments, backhaul CoMP transmission is also used to control inter-cell interference. With access link CoMP transmission, a UE can receive and transmit data from and to more than one RN or eNB, with the possibility of multiple access link CoMP transmissions for multi-hop RNs.

In embodiments, both backhaul CoMP transmissions and access link CoMP transmissions may be configured separately or jointly. Joint configuration is referred to concatenated CoMP transmission. Using a separate configuration, different CoMP transmission technologies and feedback schemes can be used in each CoMP transmission layer. In an embodiment, an RN can function both as a CoMP transmission transmit point and/or a CoMP transmission receive point.

In LTE-A, a UE specific demodulation reference signal is used for transparent DL transmission. In an embodiment using a UE specific demodulation reference signal, an eNB does not signal the transmission mode/processing since the same transmission mode/processing is applied to both the data and the UE specific demodulation reference signal. This allows the eNB greater freedom in the selection of the transmission mode, for example, by giving the eNB more scheduling flexibility.

In order for the eNB to determine the transmission mode, enough channel information is made available to the eNB in order for the eNB to make a decision. With explicit channel (H) feedback, the eNB obtains the entirety of the channel information. However, the feedback overhead can be high, especially for higher-order MIMO, MU-MIMO, and CoMP transmission. With implicit channel feedback, such as PMI feedback, the eNB relies on the recommendation of the UE(s), which can restrict some of the scheduling available at the eNB.

In an embodiment, DL precoded common sounding reference signal (PCSRS) based channel sounding is applied to CoMP channel sounding. DL PCSRS is eNB oriented, with the eNB configuring the precoding matrix adaptively according to the deployment environment, such as antenna configuration, neighboring eNBs available for CoMP transmission, propagation scenario, UE distribution, and so forth. The sounding reference signal occupies DL channel resources; therefore, less UL channel resources are required. Transparent DL channel sounding allows for the true transparent non-codebook based precoding on the UE side with simple UE implementation that does not require codebook searches or feedback.

FIG. 2a illustrates a flow diagram of embodiment DL transparent channel sounding method 200 for a base station, such as an eNB 105. In one embodiment, method 200 is used to DL transparent channel sounding to obtain feedback information to schedule CoMP transmissions.

In step 205, the eNB transmits a common sounding reference signal that has been precoded with different processing. In one embodiment, the eNB transmits the precoded common sounding reference signals (PCSRS) periodically. The precoding may be based on certain predefined matrices selected by the eNB with the predefined matrices being environment or antenna configuration dependent. Alternatively, the precoding may be based on initial full channel feedback provided by UE(s).

In an embodiment, the resource elements over which the PCSRS are transmitted are located at predefined locations, in order to simplify UE detection. For example, the PCSRS corresponding to different precoding matrices can be transmitted cyclically according to a predefined pattern in time and frequency. The PCSRS may be carried by a particular LTE-A physical resource block (PRB), for example, and information regarding the location of the PRB as well as the cyclic pattern of the PCSRS may be broadcasted to all UEs. In an embodiment, the eNB also precodes the PCSRS with a non-CoMP transmission precoding matrix (from a single cell) or a joint CoMP transmission precoding matrix (from multiple cells) to serve cell edge UEs or enable multi-cell MU-MIMO transmission. In an embodiment, the precoding is transparent to the cell edge UEs.

In step 210, the eNB receives CQI(s) from each UE. In an embodiment, the UEs measure the channel based on the PCSRS and reports the highest CQI or a specified number of the highest CQIs corresponding to certain precoding processing. The UEs do not have knowledge precoding used in the PCSRS in one embodiment. The UEs link the CQI with the corresponding precoding by including a PCSRS index in its report of the CQI explicitly or implicitly. For example, the UEs may report the location of the PRB used to receive the PCSRS or the cyclic pattern of the PCSRS. In a further embodiment, the UE further links the reported CQI to a certain predefined feedback channel.

In step 215, the eNB determines the best precoding matrix for each UE based on the reported CQI(s). From the reported CQI(s) and the PCSRS indices from the different UEs, the eNB determines a precoding matrix for each UE. In an embodiment, the eNB finds a best precoding index for a UE based on a one-to-one relationship between the precoding matrix index and the CQI index. The CQI information may be further used by the eNB for the selection of a modulation and coding scheme (MCS) if the corresponding precoding matrix is applied. In an embodiment, the information about the best precoding matrix and the corresponding CQI value may also be used by eNB to schedule MU-MIMO transmission.

FIG. 2b illustrates a flow diagram of embodiment UE method 250 for DL transparent channel sounding. UE method 250 describes operations taking place in a UE, such as UE 110, participating in DL transparent channel sounding to provide feedback information to an eNB, such as eNB 105, so that the eNB can schedule CoMP transmissions.

Method 250 begins in step 255 with the UE measuring a downlink channel using the PCSRS transmitted by the eNB. In step 260, the UE reports the highest CQI or a specified number of the highest CQIs to the eNB. The UE determines where to make the measurements using the location of the PRBs or cyclic patterns broadcast by the eNB. In an embodiment, the UE does not need to know the precoding used in the PCSRS and links the CQI (the measurement) with a corresponding precoding by including a PCSRS index in its report to the eNB.

In order to optimize closed-loop (CL) performance for CoMP transmission and advanced MIMO, sufficient spatial granularity may be needed in an embodiment. For UEs with medium to high mobility or for a situation with high correlated antennas, less spatial resolution requirement may be needed in conditions where it is difficult to track a narrow beam direction. However, rough (or coarse) beamforming may still provide a measure of CL gain when compared with open-loop (OL) transmission. This may be especially true for CoMP transmission when compared with OL CoMP transmission. Lower spatial resolution means fewer hypotheses and lower PCSRS overhead in some embodiments.

In embodiments, a higher spatial resolution may be used for low mobility UEs since to fine tune the beam formed beam. As an inverse to lower spatial resolution, higher spatial resolution means more hypotheses and higher sounding DL reference sequences. An efficient DL sounding approach that enables a fast CL beamforming adaptation with reasonable DL sounding overhead is needed. Two possible solutions exist: iterative sounding and differential PMI feedback.

FIG. 3a illustrates diagram 300 of an embodiment iterative PCSRS based DL channel sounding in advanced MIMO. Diagram 300 illustrates a portion of a communications system having eNB 305 and a number of UEs, such as UE 310, UE 315, and UE 316. UE 310 may be a UE with high mobility, while UE 315 and UE 316 may be UEs with low mobility. In alternative embodiments, greater or fewer UEs can be present.

In an embodiment, iterative PCSRS are applied to speed up the polling procedure for low mobility UEs during sounding. Iterative PCSRS uses rough tuning and fine tuning to reduce an overall number of hypotheses. In an embodiment, fine tuning is performed about a beam direction determined using rough tuning. This decreases PCSRS overhead and allows for fast CL adaptation.

In an embodiment, eNB 305 transmits a number of rough tuning PCSRS precoded with processing matrices which separates the PCSRS roughly equally in space as shown as solid ovals 325 and 330. The UEs measure the rough tuning PCSRS and report back CQI(s), from which eNB 305 determines that a rough tuning PCSRS corresponding to oval 325 is reported as highest CQI for UE 310. Similarly, for UEs 315 and 316, a rough tuning PCSRS corresponding to oval 330 is reported as highest CQI. Since UE 310 is a high mobility UE, eNB 305 does not attempt to fine tune to increase spatial resolution in some embodiments. UEs 315 and 316 are low mobility UEs, to which eNB 305 increases spatial resolution through fine tuning.

In an embodiment, eNB 305 achieves fine tuning by transmitting fine tuning PCSRS precoding with processing matrices, which separates the fine tuning PCSRS about equally in space within a region encompassed by rough tuning PCSRS corresponding to oval 330 (shown as dotted ovals 335-338). UEs 315 and 316 measure the fine tuning PCSRS and report back the CQI(s), from which eNB 305 determines the fine tuning PCSRS corresponding to the reported CQI(s) from the UEs.

In an embodiment, fine tuning may be performed in several steps, with each step obtaining greater and greater spatial resolution. In practice, the number of fine tuning steps can be determined by factors such as the mobility of the UEs, the amount of time (and other resources) that can be dedicated to the fine tuning, for example.

Figure 3B:
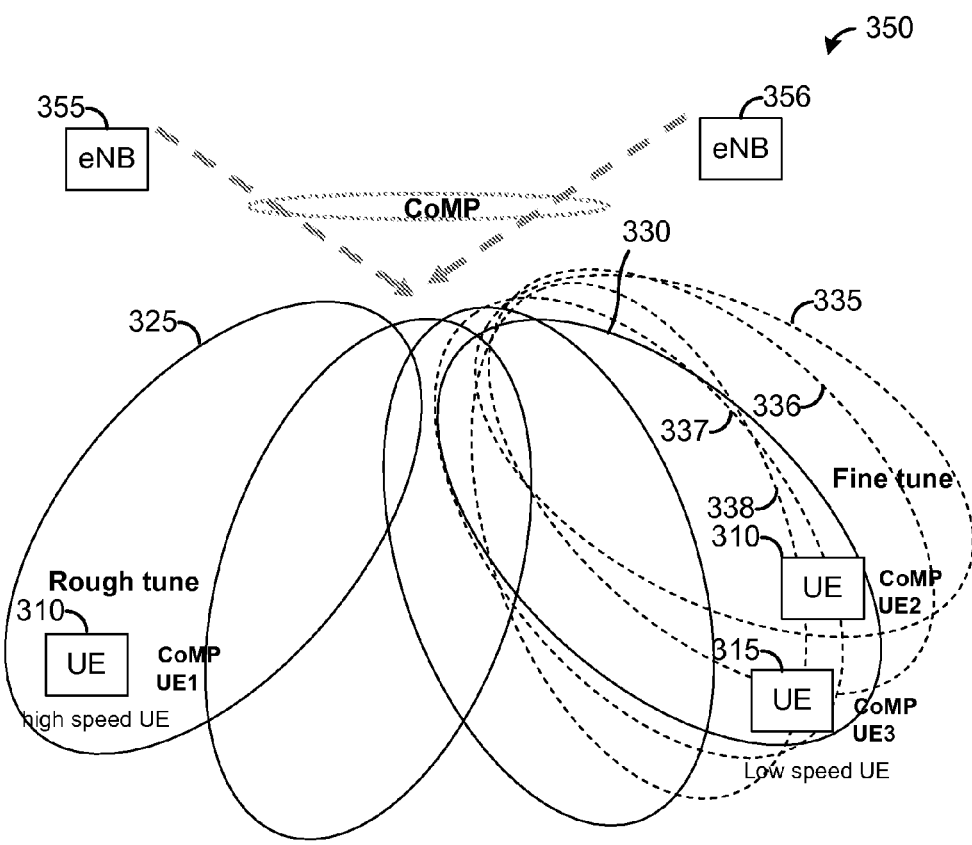
FIG. 3b is a diagram of iterative PCSRS based DL channel sounding in CoMP transmission.

FIG. 3b illustrates an embodiment diagram 350 of iterative PCSRS based DL channel sounding in CoMP transmission. As shown in FIG. 3b, diagram 350 is similar to diagram 300 and the iterative PCSRS based DL channel sounding in CoMP transmission is substantially similar to the iterative PCSRS based DL channel sounding in advanced MIMO. A difference being that more than one eNB (eNBs 355 and 356 in FIG. 3b) are used to transmit the PCSRS.

Figures 4A, 4B:
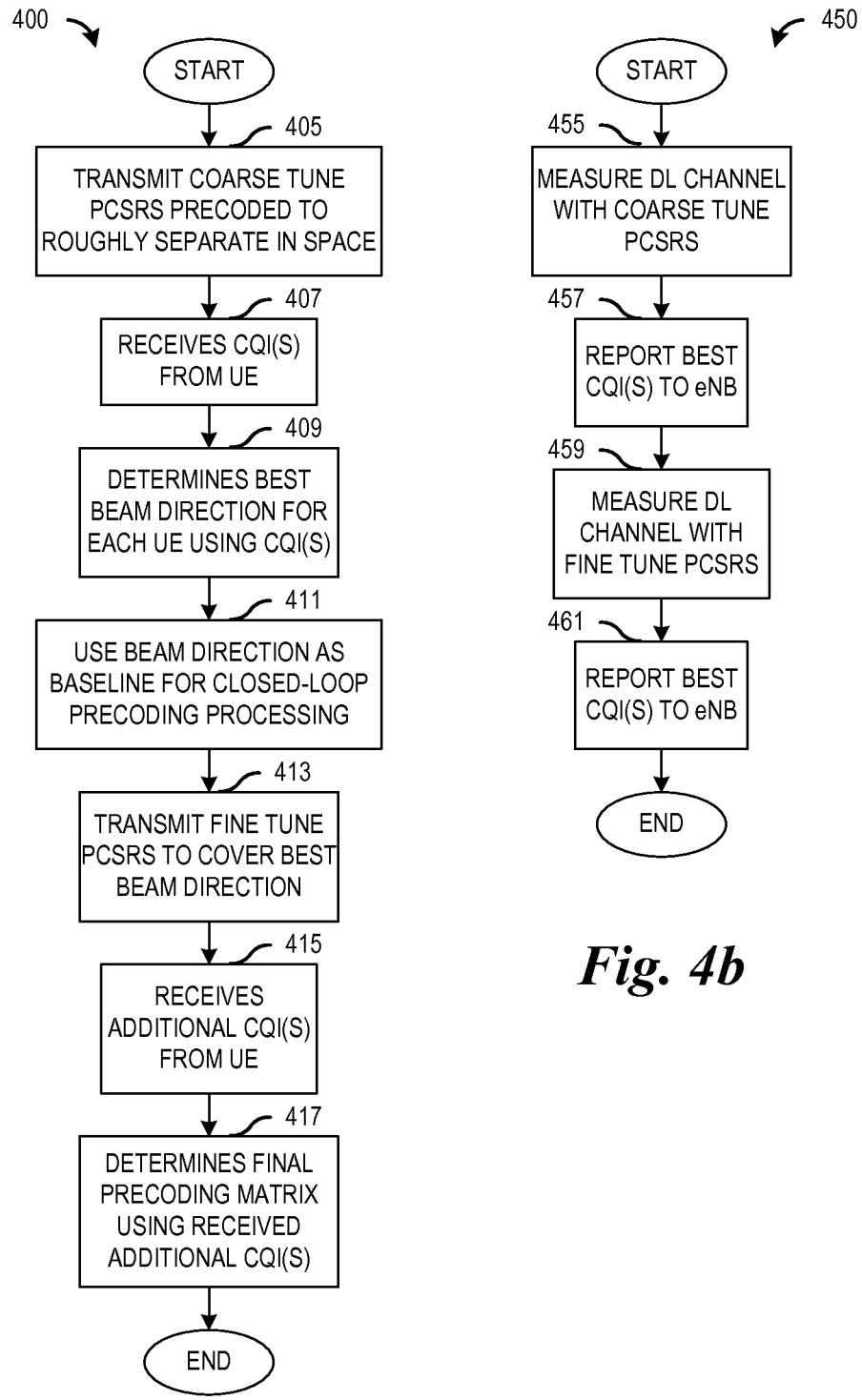
FIG. 4a is a flow diagram of eNB operations in PCSRS based DL channel sounding in CoMP transmission.
FIG. 4b is a flow diagram of UE operations in PCSRS based DL channel sounding in CoMP transmission.

FIG. 4a illustrates a flow diagram of embodiment method 400 for PCSRS based DL channel sounding in CoMP transmission. In an embodiment, method 400 is performed, for example by an eNB, such as eNB 105 (FIG. 1), to obtain feedback information to schedule CoMP transmissions.

In an embodiment, the eNB transmits a rough tuning PCSRS that is precoded with processing matrices that separate the rough tuning PCSRS roughly equally space in step 405. In an embodiment, rough beams allow for identification with less spatial granularity. In step 407, the eNB receives CQI reports from the UEs, which perform channel measurements of the rough tuning PCSRS and selects the strongest CQI (or a specified number of the strongest CQI), and reports the CQI back to the eNB. In an embodiment, the reported CQI(s) corresponds to a particular precoding matrix and corresponding PCSRS index.

From the reported CQI, the eNB determine a best PCSRS (and hence a best beam direction) for each UE in step 409. In step 411, the eNB uses the beam direction as a baseline for CL precoding processing. In an embodiment, the beam direction may also be used as a fall back for precoding processing when the eNB needs to override the recommendations of the UEs, for example.

In step 413, the eNB transmit fine tuning PCSRS that have been precoded with processing matrices that cover a region covered by rough tuning PCSRS selected by the UEs. If there are more than one rough tuning PCSRS to fine tune, each of the additional rough tuning PCSRS are fine tuned one at a time with additional fine tuning PCSRS. The eNB then receive CQI reports from the UEs. In an embodiment, the UEs have perform channel measurements of the fine tuning PCSRS and select the strongest CQI (or a specified number of the strongest CQI) and reports them back to the eNB in step 415. The fine tuning PCSRS are transmitted to the low mobility UEs. In an embodiment, the eNB identifies the low mobility UEs needing additional fine tuning, and informs the UEs or the UE in CL mode that it is in need of fine tuning. The reported CQI(s) correspond to a particular precoding matrix and corresponding PCSRS index. From the reported CQI, the eNB determine the best fine tuning PCSRS (and hence the best beam direction) for each UE in step 417.

As discussed previously, if there are multiple rough tuning PCSRS to fine tune, then the eNB may repeat the transmission of fine tuning PCSRS for each of the rough tuning PCSRS. In an embodiment, the fine tuning PCSRS are specifically designed for each of the rough tuning PCSRS. In a further embodiment, the fine tuning step can be performed multiple times to obtain a progressively finer and finer spatial resolution. In another embodiment, the fine tuning for more than one rough tuning beams can be performed at the same time.

FIG. 4b illustrates a flow diagram of UE method 450 for PCSRS based DL channel sounding in CoMP transmission. In an embodiment, method 450 is used by a UE such as UE 110 (FIG. 1), participating in PCSRS based DL channel sounding to provide feedback information to an eNB, such as eNB 105, so that the eNB can schedule CoMP transmissions.

In step 455, the UE measures a downlink channel using the coarse tuning PCSRS transmitted by the eNB. The UE then reports the highest measured CQI or a specified number of highest CQI in step 457. In an embodiment, method 450 continues with the UE measuring the downlink channel using the fine tuning PCSRS transmitted by the eNB in step 459. The UE then reports the highest measured CQI or a specified number of highest CQI in step 461.

In an embodiment, if there are several PCSRS that have a same highest measured CQI, then the UE reports all of the indices. Alternatively, the UE selects a specified number of the indices to report. In a further embodiment, the UE selects one index to report. The selection of the index (or indices) may be performed, based on eNB operating conditions (load, number of UEs served, UE priority, for example).

As discussed previously, in some embodiments, not all UEs participate in the measurement of the downlink channel with the fine tuning PCSRS. The UEs may receive messages from the eNB requesting that they participate in the fine tuning step. Alternatively, the UEs operate in CL mode and participate in the fine tune step.

In an embodiment, differential PMI feedback combines PMI feedback with PCSRS DL channel sounding. A differential codebook is applied to further improve the precoding accuracy of PCSRS based rough beam tuning. In an embodiment, the differential codebook is used to enhance the spatial resolution of a base codebook with the same codebook size, which reduces the codebook search space. In an embodiment, the differential codebook is used to trace the change of the channel. Here, the differential codebook search uses the precoded demodulation reference sequence as a reference.

Figures 5A, 5B:
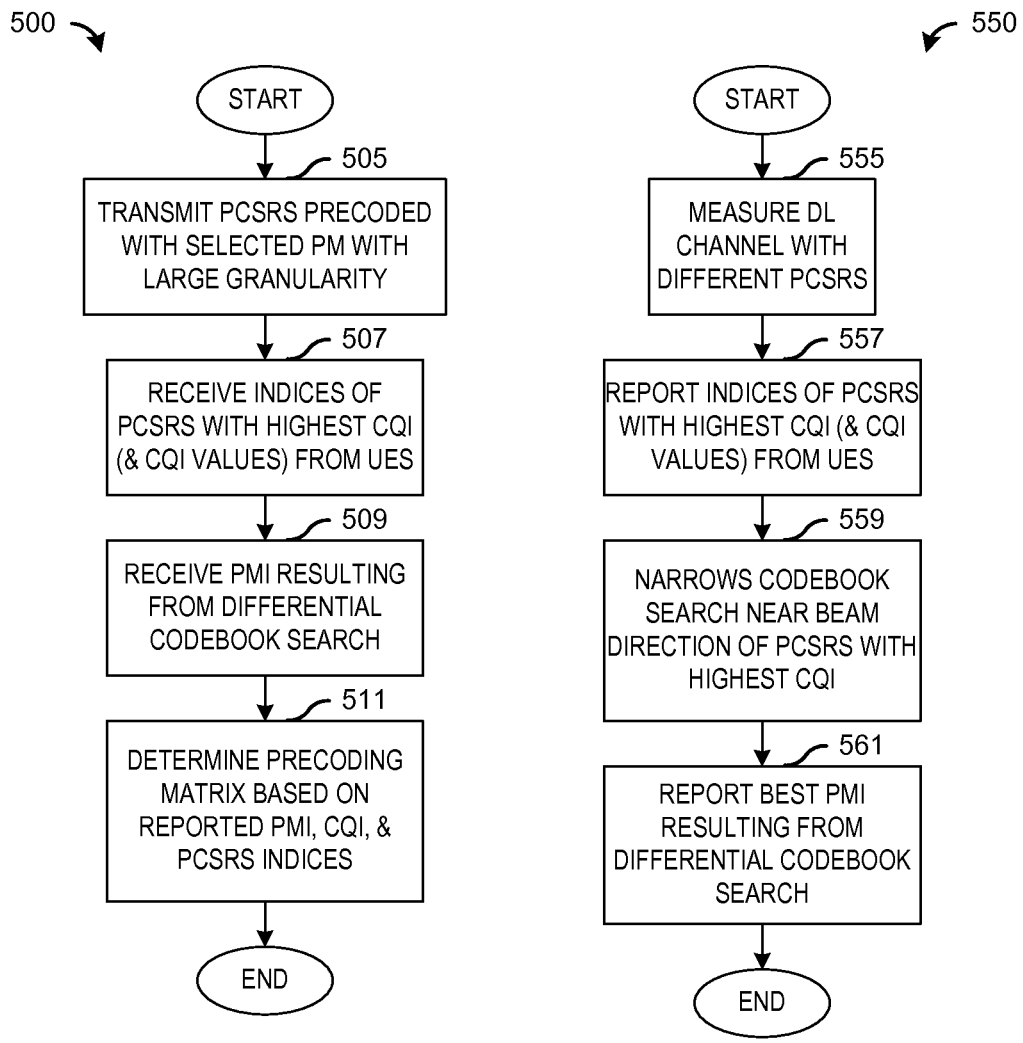
FIG. 5a is a flow diagram of eNB operations in PCSRS based differential codebook feedback.
FIG. 5b is a flow diagram of UE operations in PCSRS based differential codebook feedback.

FIG. 5a illustrates a flow diagram of an embodiment base station method 500 for PCSRS based differential codebook feedback for. In an embodiment, method 500 is performed by an eNB such as eNB 105, to obtain feedback information to schedule CoMP transmissions.

In an embodiment, the eNB initiates an initial channel sounding by sending PCSRS precoded with eNB selected precoding matrices in step 505. According to an embodiment, the precoding matrices are selected with large granularity. The eNB receives the indices of PCSRS having highest measured CQI as well as the CQI value itself from the UEs in step 507.

In addition to the PCSRS indices and CQI, the eNB also receives a PMI from a differential codebook search performed by the UEs in step 509. The eNB then determines a precoding matrix based on the reported PMI and the received PCSRS index and CQI in step 511. In an embodiment, the eNB uses the reported PCSRS from the UEs to verify the PMI feedback.

In an embodiment, the eNB overrides the PMI recommendation from the UEs (step 509) with a precoding matrix that it computes on its own from the PCSRS indices and CQI received from the UEs.

FIG. 5b illustrates embodiment UE method 550 for PCSRS based differential codebook feedback. In an embodiment, method 550 is performed by a UE, such as UE 110, to provide feedback information to an eNB, such as eNB 105, so that the eNB can schedule advanced MIMO transmission or CoMP transmissions.

In step 555, the UE measures a DL channel using the PCSRS transmitted by the eNB, where the PCSRS has been precoded with precoding matrices. In an embodiment, the precoding matrices have large granularity. In step 557, the UE report an index of a PCSRS corresponding to a highest measured CQI to the eNB. In a further embodiment, the UE may also report the highest measured CQI value in addition to the index of the PCSRS.

In step 559, the UE narrows down the codebook search by performing a differential codebook search along a direction of the PCSRS having the highest measured CQI. The PCSRS that resulted in the highest measured CQI may be used by the UE as a reference in the differential codebook search. In some embodiments, only UEs participating in CoMP transmissions perform the differential codebook search, where the UEs are based on DL signaling or a present CQI threshold. In other embodiments, UEs not participating in CoMP transmission may also perform the differential codebook search to provide more precise precoding information for MU-MIMO transmission. In step 561, the UE reports to the eNB a best PMI from the differential codebook search.

In an embodiment, if there are several PCSRS that have the same highest measured CQI, the UE reports all of the indices. Alternatively, the UE may select a specified number of the indices to report, or the UE may select one index to report. In an alternative embodiment, the selection of the index (or indices) is performed based on eNB operating conditions including, but not limited to load, number of UEs served, and UE priority.

FIG. 6 illustrates a diagram 600 of an embodiment PCSRS based channel sounding for CS/CB. Diagram 600 illustrates a portion of a communications system having a first eNB 605 and a second eNB 610. First eNB 605 serves UE 615, while second eNB 610 serves UE 616. The system shown in FIG. 6 is one example of many possible configurations. In alternative embodiments, the system illustrated in FIG. 6 can have greater or fewer UEs, eNBs and beams.

Based on measurements of PCSRS precoded with different precoding matrices transmitted by first eNB 605 and second eNB 610, UE 616 reports back to both eNBs PCSRS indices corresponding to a highest measured CQI or both a highest and a lowest measured CQI. In other words, UE 616 reports back to the eNBs the strongest and weakest beam directions. In one example, dashed oval 620 represents a weakest beam direction from first eNB 605 and solid oval 625 represents a strongest beam direction from second eNB 610. Using the information provided by the UEs, the eNBs schedule transmissions to its own UEs. For example, with knowledge of the weakest beam direction from first eNB 605 and the strongest beam direction from second eNB 610 from UE 616, first eNB 605 schedules transmissions to its UE 615 which causes the least interference to UE 616 and second eNB 610 schedules transmissions to UE 616 in the strongest beam direction 625 at the same time that first eNB 605 is transmitting to UE 615.

FIG. 7a illustrates a flow diagram of embodiment eNB method 700 for PCSRS based DL channel sounding for CS/CB. In am embodiment, method 700 is performed by an eNB, such as eNB 105, performing PCSRS based DL channel sounding for CS/CB.

In step 705, the eNB transmits a PCSRS precoded with different precoding matrices. The eNB then receives an index of PCSRS corresponding to PCSRS having a highest measured CQI or indices of PCSRS having highest and lowest measured CQI in step 707. The eNB informs neighboring cells (eNBs) of weakest beam directions of its cell edge UEs in step 709. In step 711, the eNB schedules transmission to UEs in a same beam direction as weakest beam direction of neighboring cells.

FIG. 7b illustrates a flow diagram of UE method 750 for PCSRS based DL channel sounding for CS/CB. In an embodiment, method 750 is performed by a UE, such as UE 110, participating in PCSRS based DL channel sounding for CS/CB.

In step 755, the UE measures a DL channel using the PCSRS transmitted by the eNB. The UE then reports either an index of a PCSRS having highest measured CQI or indices of PCSRS having highest measured CQI and lowest measured CQI in step 757.

In an embodiment, if there are several PCSRS that have the same highest (or lowest) measured CQI, the UE may report all of the indices. Alternatively, the UE may select a specified number of the indices to report, or the UE may select one index to report. In a further embodiment, the selection of the index (or indices) may be performed based on eNB operating conditions including, but not limited to load, number of UEs served and UE priority.

In some embodiment, there may be different CoMP transmission feedback schemes for backhaul CoMP transmission and access link CoMP transmission. For example, an explicit feedback scheme may be used for backhaul CoMP transmission. With backhaul CoMP transmissions to fixed RNs, an explicit feedback scheme may have an acceptable level of UL feedback overhead.

In an embodiment, a hybrid DL channel sounding scheme is used for access link CoMP transmission. The hybrid DL channel sounding scheme includes both explicit and implicit DL channel sounding. The explicit DL channel sounding is performed as an initial DL channel sounding with the UEs feeding back information regarding the DL channel to the serving eNB. For CoMP transmission, the UE feeds back the DL channel to the neighboring eNBs as well. In an embodiment, implicit channel sounding is used to keep track of changes in the DL channel. Additionally, an explicit feedback scheme may be used for fixed UEs, while a PCSRS based feedback scheme may be used for UEs that are mobile having low, medium or high mobility. In an embodiment, the PCSRS based feedback scheme uses non-adaptive PCSRS based sounding for medium and high mobility UEs and adaptive PCSRS based sounding and PCSRS based differential codebook feedback for low mobility UEs.

In further embodiment, hybrid DL channel sounding schemes are used for higher-order SU-MIMO or MU-MIMO (referred to collectively as advanced MIMO). In higher-order MIMO systems, non-adaptive techniques, such as non-adaptive PCSRS based sounding, are used for medium and high mobility UEs or for a system having highly correlated antennas. In an embodiment, adaptive PCSRS based sounding is used for low mobility UEs. In high-order MIMO systems with uncorrelated transmit antennas; a PCSRS based differential codebook feedback technique can be used.

Figure 8:
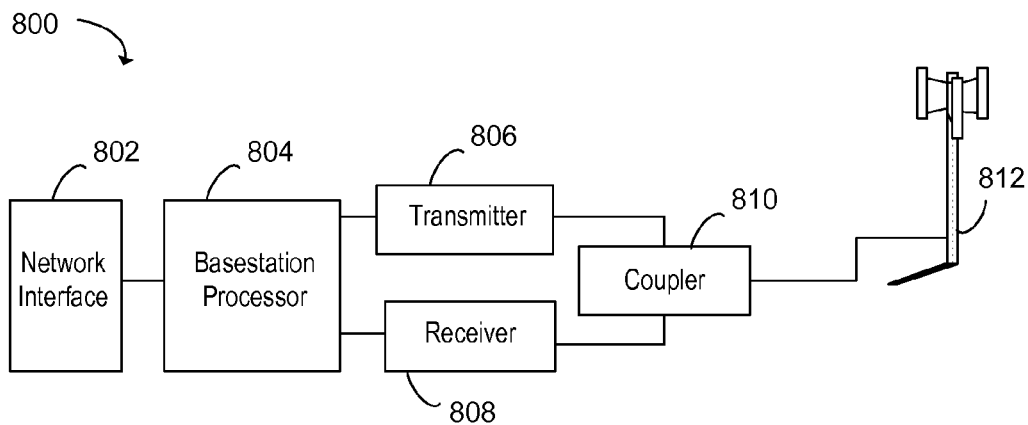
FIG. 8 illustrates a block diagram of an embodiment base station.

A block diagram of an embodiment base station 800 is illustrated in FIG. 8. Base station 800 has base station processor 804 coupled to transmitter 806 and receiver 808, and network interface 802. Transmitter 806 and receiver 808 are coupled to antenna 812 via coupler 810. Base station processor 804 executes embodiment methods and algorithms. In an embodiment, base station 800 is configured to operate in a LTE network using an OFDMA downlink channel divided into multiple subbands and using single carrier FDMA in the uplink. In alternative embodiments, other systems, network types and transmission schemes can be used, for example, 1×EV-DO, IEEE 802.11, IEEE 802.15 and IEEE 802.16. In alternative embodiments, base station 800 can have multiple transmitters, receivers and antennas (not shown) to support MIMO operation.

Figure 9:
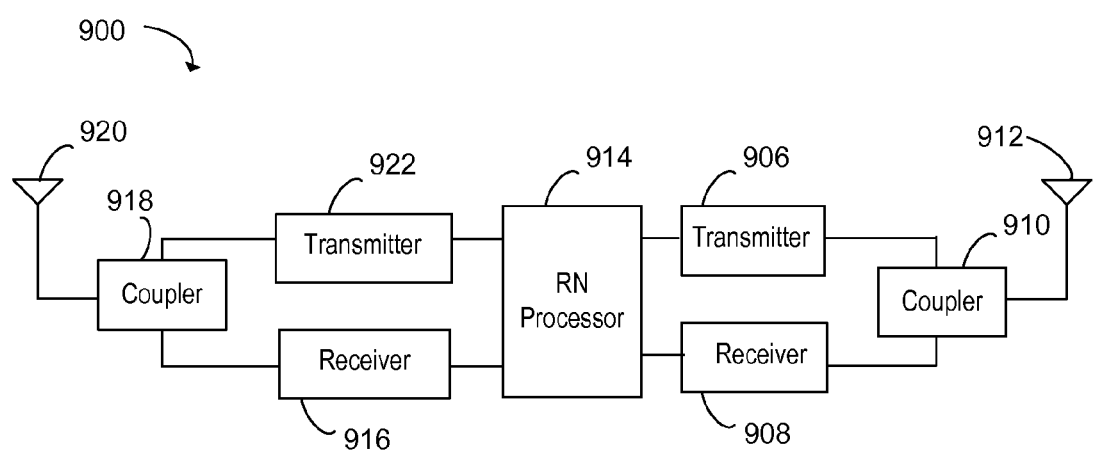
FIG. 9 illustrates a block diagram of an embodiment relay node.

A block diagram of an embodiment relay node 900 is shown in FIG. 9. Relay node 900 has donor antenna 920, which transmits to and from the base station and is coupled to coupler 918, transmitter 922 and receiver 916. Service antenna 912, which transmits to and receives signals from user devices, is coupled to coupler 910, transmitter 906 and receiver 908. RN processor 914, which is coupled to both the donor and service signal paths, controls the operation of relay node and implements embodiment algorithms described herein. In an embodiment of the present invention, relay node 900 is configured to operate in a LTE network using an OFDMA downlink channel divided into multiple subbands and using single carrier FDMA in the uplink. In alternative embodiments, other systems, network types and transmission schemes can be used.

Figure 10:
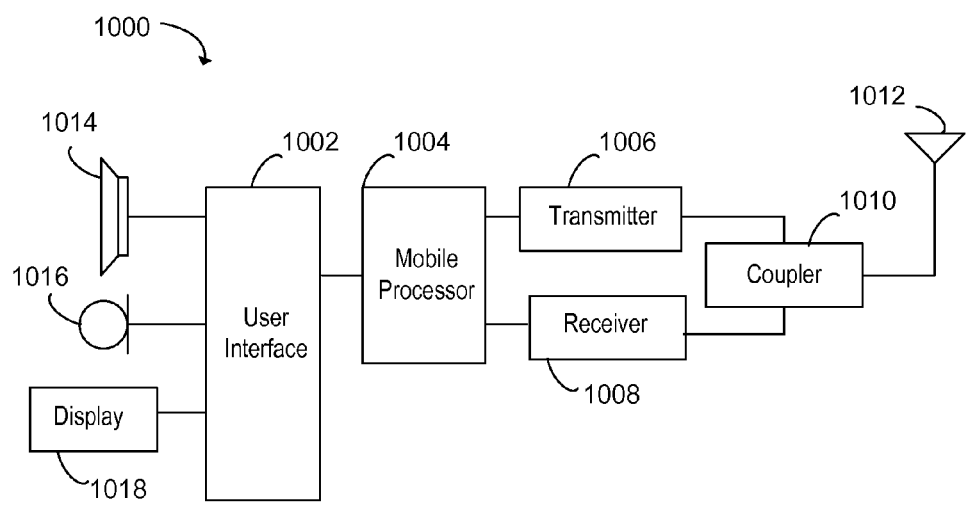
FIG. 10 illustrates a block diagram of an embodiment user device.

A block diagram of embodiment user device 1000 is illustrated in FIG. 10. User device 1000 can be, for example, a cellular telephone or other mobile communication device, such as a computer or network enabled peripheral. Alternatively, user device 1000 can be a non-mobile device, such as a desktop computer with wireless network connectivity. User device 1000 has mobile processor 1004, transmitter 1006 and receiver 1008, which are coupled to antenna 1012 via coupler 1010. User interface 1002 is coupled to mobile processor 1004 and provides interfaces to loudspeaker 1014, microphone 1016 and display 1018, for example. Alternatively, user device 1000 may have a different configuration with respect to user interface 1002, or user interface 1002 may be omitted entirely. In embodiment, user device is configured to operate according to embodiment algorithms. In alternative embodiments, user device 1000 can have multiple transmitters, receivers and antennas (not shown) to support MIMO operation. In an embodiment, a method of operating a base station configured to communicate with at least one user device includes transmitting a reference signal to the at least one user device, receiving channel quality information from the at least one user device, and forming a beam based on the channel quality information received from the at least one user device. In one embodiment forming the beam comprises forming a beam using a plurality of antennas. In a further embodiment, forming the beam includes coordinating a transmission from at least one further base station. In an embodiment, coordinating the transmission comprises communicating the at least one further base station via an X2 link. In some embodiment, forming a beam includes computing a precoding matrix for the at least one user device, and in a further embodiment, forming the beam includes iteratively adjusting the beam based on the channel quality information from the at least one user device. In an embodiment, the reference signal is a precoded common sounding reference signal (PCSRS).

In an embodiment, the method also includes sharing weakest beam directions with the at least one further base station, and scheduling transmissions to the at least one user device using precoding matrices corresponding to weakest beam directions of the least one further base station. In an embodiment, sharing weakest beam directions further includes transmitting weakest beam directions the at least one further base station, and receiving weakest beam directions from the at least one further base station.

In some embodiment, the base station is operated on a long term evolution (LTE) network. The base station is an eNB and the at least one user device comprises a UE. Alternatively, the base station can be an RN.

In a further embodiment, forming the beam includes performing a coarse beam adjustment based on the channel quality information from the at least one user device. After the coarse beam adjustment, a fine beam adjustment is performed. The fine beam adjustment includes receiving precoding matrix indication (PMI) based differential codebook feedback from the at least one user device and adjusting the beam based on the PMI differential codebook feedback.

In a further embodiment, a method for operating in a communications network having a plurality of communications devices includes performing a coarse tuning with the plurality of communications devices to achieve a first degree of spatial granularity; and performing a fine tuning with a subset of the plurality of communications devices to achieve a second degree of spatial granularity. In an embodiment, the subset of communications devices includes communications devices having low mobility. In one embodiment, performing the coarse tuning includes transmitting a first number of precoded reference sequences to the plurality of communications devices, receiving channel information from the plurality of communications devices, and computing a best rough tune precoding matrix for each communications device based on the received channel information. In an embodiment, the precoded reference sequences are precoded with precoding matrices that roughly separate the precoded reference sequences about equally in space.

In an embodiment, the received channel information includes channel quality measurements for each of the precoded reference sequences. The received channel information includes a highest channel quality measurement for a precoded reference sequence out of the number of precoded reference sequences in an embodiment. In some embodiments, the best rough tune precoding matrix includes a precoding matrix used to precode a precoded reference sequence corresponding to the highest channel quality measurement.

In an embodiment, performing the fine tuning includes selecting a best precoding matrix based on results of the coarse tuning and transmitting a second number of precoded reference sequences to the subset of communications devices, where the precoded reference sequences are precoded with precoding matrices that separate the precoded reference sequences about equally around a beam direction corresponding to the best precoding matrix. The method also includes receiving second channel information from the subset of communications devices and computing a best fine tune precoding matrix for each communications device in the subset of communications devices based on the received second channel information. In one embodiment, there are multiple best precoding matrices, and the method further includes repeating the selecting, the transmitting, the receiving, and the computing for each best precoding matrix in the multiple best precoding matrices.

In an embodiment, a base station includes an antenna, a transmitter coupled to the antenna, a receiver configured to receive channel quality information from at least one user device, and a processor calculating a beam direction for the least one user device, the beam direction based on the received channel quality information. The transmitter is configured to transmit a sounding signal to the at least one user device. In an embodiment, the antenna includes a plurality of antennas and the transmitter transmits via the plurality of antennas using multiple input, multiple output (MIMO) techniques. In a further embodiment, the base station further includes a communication interface with at least one further base station, where the base station coordinates transmission with the at least one further base station using the communication interface.

In an embodiment, a relay node (RN) includes a backhaul link transceiver and an access link transceiver. The relay node receives first coordinated multi-point (CoMP) transmissions from a plurality of base stations from the backhaul link transceiver, and the relay node transmits second CoMP transmissions on the access link transceiver to at least one user device in cooperation with at least one further base station or at least one further relay node. In an embodiment, the first CoMP transmissions have a different feedback scheme from the second CoMP transmissions.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a base station configured to communicate wirelessly in a wireless network, the method comprising:
   transmitting a precoded common sounding reference signal (PCSRS) to a user device;
   receiving channel quality information related to the PCSRS from the user device; and
   transmitting a beam-formed data signal to the user device, wherein transmitting the beam-formed data signal comprises adjusting a beam direction of the beam-formed data signal based on the channel quality information related to the PCSRS received from the user device.

2. The method of claim 1, wherein the beam-formed data signal is transmitted from a single base station.

3. The method of claim 1, wherein the beam-formed data signal is a joint transmission coordinated between multiple base stations.

4. The method of claim 3, further comprising:
   sharing a first weakest beam direction between two of the multiple base stations; and
   scheduling transmissions to the user device using precoding matrices corresponding to the first weakest beam direction.

5. The method of claim 3, wherein control signaling for coordinating the joint transmission is communicated between at least two of the multiple base stations via an X2 link.

6. The method of claim 1, wherein the beam-formed data signal is a joint transmission coordinated between the base station and at least one relay node on a backhaul link and on an access link.

7. The method of claim 1, wherein the wireless network is a long term evolution (LTE) network, the base station comprises an enhanced Node B (eNB), and the user device comprises user equipment (UE).

8. The method of claim 1, wherein transmitting a beam-formed data signal to the user device comprises computing a precoding matrix for the user device.

9. The method of claim 1, wherein transmitting the beam-formed data signal to the user device comprises:
   performing a coarse beam adjustment based on the channel quality information from the user device; and
   performing a fine beam adjustment after performing the coarse beam adjustment.

10. The method of claim 9, wherein performing the fine beam adjustment comprises:
    receiving precoding matrix indication (PMI) differential codebook feedback from the user device, and
    adjusting the beam direction in accordance with the PMI differential codebook feedback.

11. The method of claim 1, further comprising:
    performing a coarse tuning with the user device to achieve a first degree of spatial granularity; and
    performing a fine tuning with the user device to achieve a second degree of spatial granularity.

12. The method of claim 11, wherein performing the coarse tuning comprises:
    transmitting precoded reference sequences to user device, wherein the precoded reference sequences are precoded with precoding matrices separating the precoded reference sequences;
    receiving channel information related to the from the user device; and
    computing a best rough tune precoding matrix for user device based on the received channel information.

13. The method of claim 12, wherein the received channel information comprises channel quality measurements for each of the precoded reference sequences.

14. The method of claim 12, wherein the received channel information comprises a highest channel quality measurement for a precoded reference sequence out of the precoded reference sequences.

15. The method of claim 14, further comprising generating one or more additional precoded reference sequences based on the best rough tune precoding matrix, wherein the best rough tune precoding matrix corresponds to the precoded reference sequence having the highest channel quality measurement.

16. The method of claim 1, wherein the received channel quality information includes an index of the PCSRS.

17. A base station in a wireless network, the base station comprising:
    a processor; and
    a non-transitory computer readable storage medium storing programming for execution by the processor, the programming including instructions to:
        transmit a precoded common sounding reference signal (PCSRS) to a user device;
        receive channel quality information related to the PCSRS from the user device; and
        transmit a beam-formed data signal to the user device, wherein transmitting the beam-formed data signal comprises adjusting a beam direction of the beam-formed data signal based on the channel quality information related to the PCSRS received from the user device.

18. The base station of claim 17, wherein the beam-formed data signal is transmitted from a single base station.

19. The base station of claim 17, wherein the beam-formed data signal is a joint transmission coordinated between multiple base stations.

20. The base station of claim 19, wherein the programming further includes instructions to:
    share a first weakest beam direction between two of the multiple base stations; and
    schedule transmissions to the user device using precoding matrices corresponding to the first weakest beam direction.

21. The base station of claim 19, wherein control signaling for coordinating the joint transmission is communicated between at least two of the multiple base stations via an X2 link.

22. The base station of claim 17, wherein the beam-formed data signal is a joint transmission coordinated between the base station and at least one relay node on a backhaul link and on an access link.

23. The base station of claim 17, wherein the instructions to transmit the beam-formed data signal to the user device include instructions to compute a precoding matrix for the user device.

24. The base station of claim 17, wherein the instructions to transmit the beam-formed data signal to the user device include instructions to:
    perform a coarse beam adjustment based on the channel quality information from the user device; and
    perform a fine beam adjustment after performing the coarse beam adjustment.

25. The base station of claim 24, wherein the instructions to perform the fine beam adjustment include instructions to:
    receive precoding matrix indication (PMI) differential codebook feedback from the user device, and
    adjust the beam direction in accordance with the PMI differential codebook feedback.

26. The base station of claim 17, wherein the programming further include instructions to:
    perform a coarse tuning with the user device to achieve a first degree of spatial granularity; and
    perform a fine tuning with the user device to achieve a second degree of spatial granularity.

27. The base station of claim 26, wherein the instructions to perform the coarse tuning include instructions to:
    transmit precoded reference sequences to user device, wherein the precoded reference sequences are precoded with precoding matrices separating the precoded reference sequences;
    receive channel information related to the from the user device; and
    compute a best rough tune precoding matrix for user device based on the received channel information.

28. The base station of claim 27, wherein the received channel information comprises channel quality measurements for each of the precoded reference sequences.

29. The base station of claim 27, wherein the received channel information comprises a highest channel quality measurement for a precoded reference sequence out of the precoded reference sequences.

30. The base station of claim 29, wherein the programming further includes instructions to generate one or more additional precoded reference sequences based on the best rough tune precoding matrix, wherein the best rough tune precoding matrix corresponds to the precoded reference sequence having the highest channel quality measurement.

31. The base station of claim 17, wherein the received channel quality information includes an index of the PCSRS.

* * * * *